(12) United States Patent
Guest

(10) Patent No.: US 8,029,024 B2
(45) Date of Patent: Oct. 4, 2011

(54) TUBE COUPLINGS

(75) Inventor: Timothy Stephen Guest, Bray (GB)

(73) Assignee: John Guest International Limited, West Drayton, Middlesex (GB)

( * ) Notice: Subject to any disclaimer, the term of this patent is extended or adjusted under 35 U.S.C. 154(b) by 220 days.

(21) Appl. No.: 12/473,823

(22) Filed: May 28, 2009

(65) Prior Publication Data

US 2009/0295152 A1    Dec. 3, 2009

(30) Foreign Application Priority Data

May 28, 2008 (GB) .................................. 0809685.1
Jun. 25, 2008 (GB) .................................. 0811665.9

(51) Int. Cl.
*F16L 37/18* (2006.01)
(52) U.S. Cl. ......................... 285/314; 285/322
(58) Field of Classification Search .................. 285/314, 285/322, 324, 323
See application file for complete search history.

(56) References Cited

U.S. PATENT DOCUMENTS

| | | | |
|---|---|---|---|
| 2,004,967 A * | 6/1935 | Williams ....................... | 285/314 |
| 4,005,883 A | 2/1977 | Guest | |
| 4,573,716 A | 3/1986 | Guest | |
| 4,606,783 A | 8/1986 | Guest | |
| 4,632,437 A * | 12/1986 | Robson et al. ................. | 285/314 |
| 4,637,636 A | 1/1987 | Guest | |
| 4,645,246 A | 2/1987 | Guest | |
| 4,650,529 A | 3/1987 | Guest | |
| 4,657,286 A | 4/1987 | Guest | |
| 4,722,560 A | 2/1988 | Guest | |
| 4,804,213 A | 2/1989 | Guest | |
| 4,923,220 A | 5/1990 | Guest | |
| 4,946,213 A | 8/1990 | Guest | |
| 4,958,858 A | 9/1990 | Guest | |
| 5,370,423 A | 12/1994 | Guest | |
| 5,390,969 A | 2/1995 | Guest | |
| 5,401,064 A | 3/1995 | Guest | |
| 5,443,289 A | 8/1995 | Guest | |
| 5,468,027 A | 11/1995 | Guest | |
| 5,607,193 A | 3/1997 | Guest | |
| 5,683,121 A | 11/1997 | Guest | |
| 5,738,387 A | 4/1998 | Guest | |
| 5,775,742 A | 7/1998 | Guest | |
| 5,779,284 A | 7/1998 | Guest | |
| 5,915,738 A | 6/1999 | Guest | |

(Continued)

FOREIGN PATENT DOCUMENTS

EP    1 258 666 A1    11/2002

(Continued)

*Primary Examiner* — David E Bochna
(74) *Attorney, Agent, or Firm* — Workman Nydegger

(57) ABSTRACT

A tube coupling includes a coupling body (10) having an open ended throughway (11) to receive a tube (16). A collet (20) is located in the open end of the throughway having a ring (21) and a plurality of flexible arms (22) extending into the throughway. The throughway has a tapered cam surface (25) convergent towards the open end and the collet arms have heads (23) at their distal ends for engaging both the cam surface and a tube extending through the collet into the throughway to be compressed against the tube by the cam surface with outward movement of the collet with respect to the throughway to secure the tube in the throughway. A collet lock (27) is rotatably mounted on the coupling body having one rotary position in which the lock holds the collet (20) and another rotary position in which the collet can move axially.

21 Claims, 12 Drawing Sheets

U.S. PATENT DOCUMENTS

| | | | |
|---|---|---|---|
| 6,056,326 A | 5/2000 | Guest | |
| 6,173,999 B1 | 1/2001 | Guest | |
| 6,439,620 B1 | 8/2002 | Guest | |
| 6,863,314 B2 | 3/2005 | Guest | |
| 6,880,865 B2 | 4/2005 | Guest | |
| RE38,786 E | 8/2005 | Guest | |
| 6,929,289 B1 | 8/2005 | Guest | |
| 6,957,833 B2 | 10/2005 | Guest | |
| 7,032,932 B2 | 4/2006 | Guest | |
| 7,082,957 B2 | 8/2006 | Guest | |
| 7,100,948 B2 | 9/2006 | Guest | |
| 7,543,858 B1 * | 6/2009 | Wang | 285/314 |
| 7,658,420 B2 * | 2/2010 | Harger et al. | 285/314 |
| 7,857,361 B1 * | 12/2010 | Hanser et al. | 285/314 |
| 2002/0109353 A1 | 8/2002 | Guest | |
| 2003/0201641 A1 | 10/2003 | Guest | |
| 2006/0181080 A1 | 8/2006 | Guest | |
| 2006/0202478 A1 | 9/2006 | Guest | |
| 2007/0034255 A1 | 2/2007 | Guest | |
| 2007/0034817 A1 | 2/2007 | Guest | |
| 2007/0194568 A1 | 8/2007 | Guest | |
| 2007/0200344 A1 | 8/2007 | Guest | |
| 2008/0136166 A1 | 6/2008 | Guest | |
| 2009/0140514 A1 | 6/2009 | Guest | |

FOREIGN PATENT DOCUMENTS

| | | |
|---|---|---|
| EP | 1 359 363 A2 | 11/2003 |
| EP | 1 433 992 A1 | 6/2004 |
| GB | 1 520 742 | 8/1978 |
| GB | 2 301 158 A | 11/1996 |
| WO | WO 90/08288 | 7/1990 |

* cited by examiner

TUBE COUPLINGS

CROSS-REFERENCE TO RELATED APPLICATIONS

This application claims priority to United Kingdom Application Serial Nos. 0809685.1, filed May 28, 2008 and 0811665.9, filed Jun. 25, 2008, which are incorporated herein by specific reference.

BACKGROUND OF THE INVENTION

1. The Field of the Invention

This invention relates to tube couplings for providing tube connections in lines of tube or pipe for conducting fluids in the form of gases or liquids.

2. The Relevant Technology

In our UK Patent Specification No. 1520742 we describe and illustrate a tube coupling comprising a coupling body having an open ended throughway to receive a tube. A collet is located in the open end of the throughway having a ring and a plurality of flexible arms extend generally of the ring into the throughway.

The throughway has a tapered cam surface convergent towards said open end of the throughway and the collet arms having heads at their distal ends for engaging both the cam surface and a tube extending through the collet into the throughway. The head on the collet arms are compressed against the tube by the cam surface with movement of the collet towards the open end of the throughway to secure the tube in the throughway. The collet ring extends out of the throughway and has an out-turned flange or head to facilitate manipulation of the collet by a tool or by hand to lock and release a tube in the coupling body. A "C" shaped locking clip may be provided for engagement between the head or flange of the collet and the adjacent end of the coupling body to hold the collet in an outwardly extended position in which the tube is locked in the coupling body by the collet to prevent accidental release of the collet. The provision of a separate component for the locking function can result in a collet being left unlocked if a clip is not available for a coupling body or the installer simply overlooks applying the clip to the collet.

SUMMARY OF THE INVENTION

This invention provides a tube coupling comprising a coupling body having an open ended throughway to receive a tube, a collet located in the open end of the throughway having a ring and a plurality of flexible arms extending generally axially of the ring into the throughway, the throughway having a tapered cam surface convergent towards said open end and the collet arms having heads at their distal ends for engaging both the cam surface and a tube extending through the collet into the throughway to be compressed against the tube by the cam surface with outward movement of the collet with respect to the throughway to secure the tube in the throughway and a collet lock rotatably mounted on the coupling body having one rotary position in which the lock holds the collet in said outward tube securing position and another rotary position in which the collet can move axially with respect to the throughway for release and engagement of a tube by the collet.

In a preferred arrangement according to the invention the collet lock has means for driving the collet outwardly of the throughway with rotation of the lock and to retain the collet in an outward tube securing position.

More specifically the collet lock and coupling body may have interengaging guide means to displace the collet lock axially outwardly of the coupling body with rotation of the collet lock and thereby to drive the collet outwardly of the coupling body.

For example, the interengaging means acting between the collet lock and the coupling body may comprise cam means acting between the collet lock and coupling body.

In the latter arrangement the cam means may comprise a cam and cam follower on the collet lock and coupling body respectively or vice versa.

In any of the above arrangements the collet lock may comprise a sleeve encircling the coupling body.

In the latter case the sleeve may be coupled to the ring of the collet to draw the collet outwardly of the coupling body with axial movement of the sleeve outwardly of the coupling body.

In one, preformed arrangement the collet ring projects from the open end of the coupling body and one end of the sleeve projects beyond that end of the coupling body and has an in-turned flange which engages with the ring so that axially outward movement of the cap drives the collet axially outwardly of the throughway.

More specifically the collet ring may have an out-turned head and the flange of the sleeve may engage behind the head.

In any of the latter arrangements said cam surface may be formed around the coupling body and a cam or cams may be formed in the sleeve which engage the cam surface.

In one example according to the invention the cam surface may be formed on the outer side of the coupling body within the sleeve and the cam or cams may be formed in the sleeve.

In a further arrangement, the cam surface may be formed on the throughway within the coupling body and the cam or cams may be formed on the in-turned flange at said one end of the sleeve and to engage the cam surface and project into the throughway.

In any of the latter arrangements the cam surface on the coupling body may be shaped so that there is 90° of rotation of the cap between the collect locked and collet released positions.

According to a further feature, the cam surface is shaped to resist rotation of the sleeve in either direction from the collet locking position.

For example, the cam surface may be provided with a shallow recess to receive the cam in the collet locking position to provide resistance to rotation of the sleeve from the collet locking position in either direction.

In any of the above arrangements the coupling body may have one or more apertures to enable the location of a tube inserted into the throughway to be viewed.

In the latter case the sleeve is shaped to cover the aperture or apertures in the collet locked position and to reveal the aperture or apertures in the collet released position.

BRIEF DESCRIPTION OF THE DRAWINGS

The following is a description of some specific embodiments of the invention, reference being made to the accompanying drawings in which.

DETAILED DESCRIPTION OF THE PREFERRED EMBODIMENTS

Figure 1:
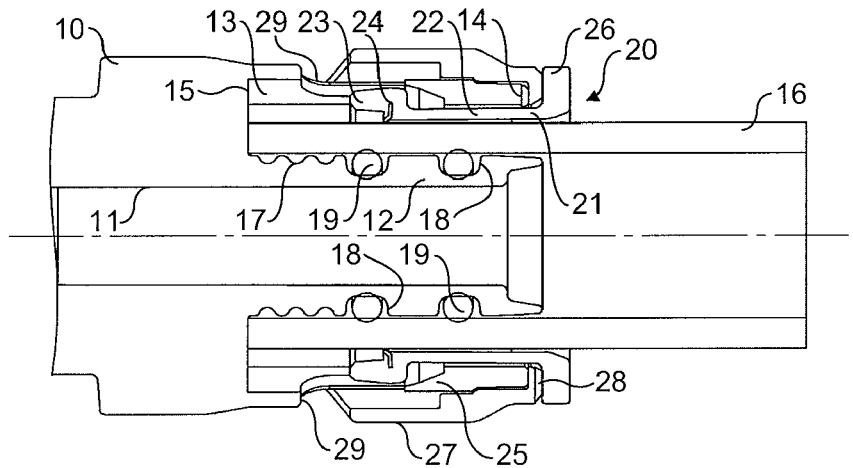
FIG. 1 is a cross-sectional view through a tube coupling having a coupling body, a collet in the coupling body for locking a tube in place, a tube inserted into the coupling body and a locking device for the collet to prevent inadvertent release of a tube from the coupling body with the locking device shown in the unlocked position and with a window in the coupling body to view the locking mechanism revealed by the collet locking device.
Figure 2:
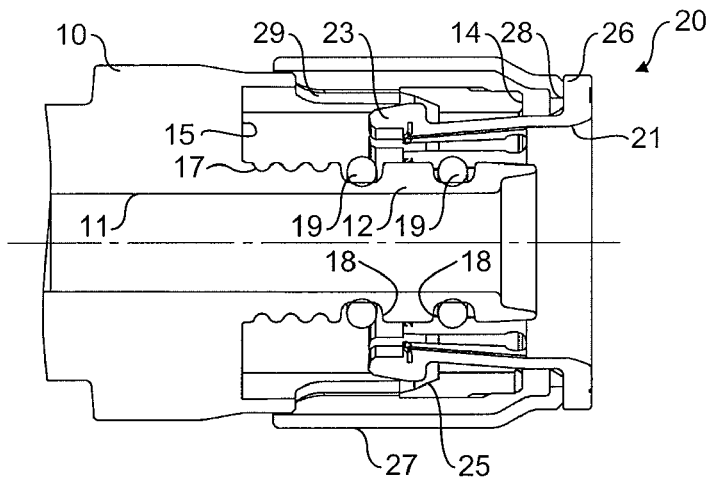
FIG. 2 is a similar view to FIG. 1 showing the locking device in the collet locking position and the window into the coupling body covered by the collet locking device.
Figure 3:
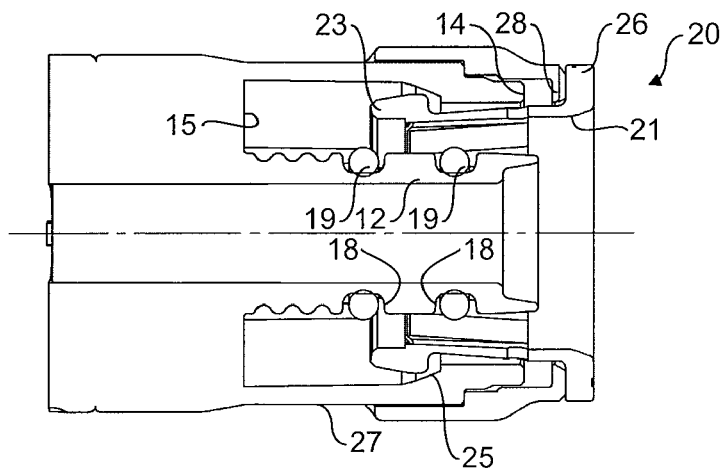
FIG. 3 is a view of the tube coupling in a condition shown in FIG. 2 with the section taken at 90° to that of FIG. 2.
Figure 4:
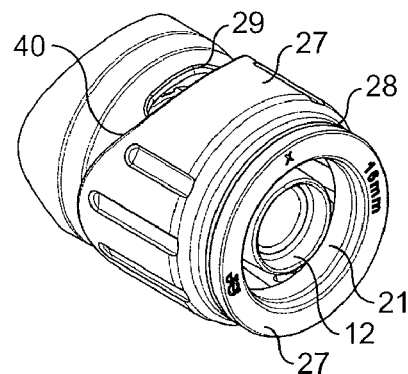
FIG. 4 is a perspective view of the tube coupling as shown in FIG. 1 with the tube omitted.
Figure 5:
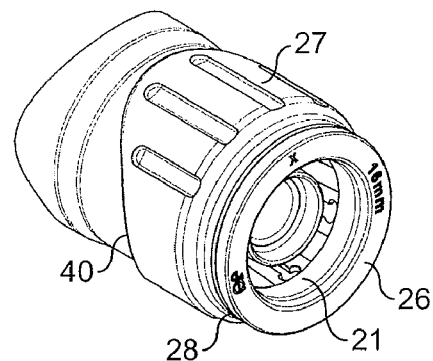
FIG. 5 is a perspective view of the tube coupling as shown in FIG. 2 with the tube omitted.

Referring firstly to the arrangement of FIGS. 1 to 8 of the drawings, there is shown a tube coupling body 10 moulded in high strength plastics material having a central throughway 11 which terminates in an internal cylindrical spigot 12.

An annular recess 13 extends into the wall of the coupling body from an end face 14 of the coupling body and terminates in a step 15 to form a socket for receiving an end of a tube 16 around the spigot 12.

The external surface of the spigot adjacent the end 15 of the socket is corrugated as indicated at 17 to grip the internal surface of the tube 16 and the outer surface of the spigot is also formed with two spaced annular grooves 18 in which O ring seals 19 are located to seal with internal surface of the tube 16 located over the spigot.

The tube is held on the spigot in the socket by means of a collet indicated at 20 also formed in moulded plastics. The collet comprises a ring 21 located at the mouth of the socket and having a plurality of axially extending flexible arms 22 which terminate in heads 23. Metal teeth 24 are moulded into the heads and project on the inner sides of the heads to engage and grip the tube 16.

The wall of the coupling body around the socket is formed with a tapered cam surface 25 converging towards the open end of the socket with which the heads 23 are engageable to compress the heads against the outer surface of the tube with a slight withdrawal movement of the collet from the coupling body.

The ring 21 of the collet projects outwardly of the open end of the socket and has an integral out-turned flange or head 26 which overlies the end of the coupling body.

A collet lock comprising sleeve 27 is located on the coupling body adjacent the open end of the coupling body for rotation about the coupling body and also for axial sliding movement on the end of the coupling body. The sleeve has an in-turned flange 28 which engages between the end of the coupling body and the head 26 of the collet.

The outer wall of the coupling body encircling the socket is formed with spaced ports 29 to enable the locking of a tube by the heads of the collet to be viewed and checked by the operator.

Figure 6:
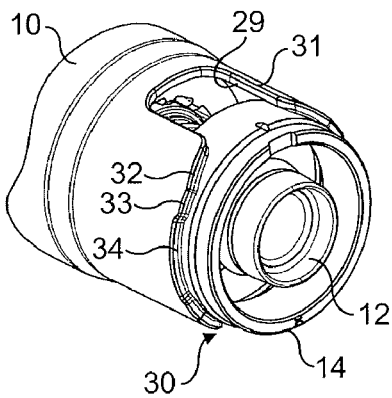
FIG. 6 is a perspective view of the tube coupling as shown in FIG. 5 with the collet locking device omitted.
Figure 7:
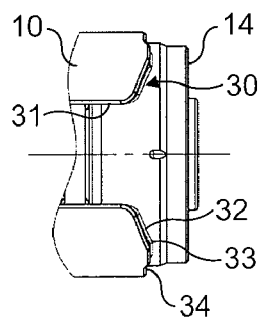
FIG. 7 is a side view of the coupling body as shown in FIG. 6.
Figure 8:
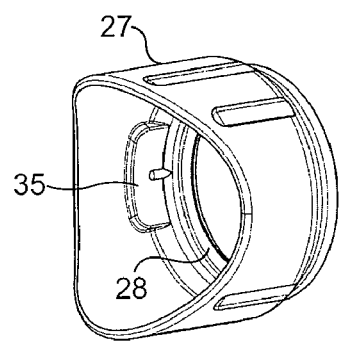
FIG. 8 is a perspective view of the collet locking sleeve.
Figure 9:
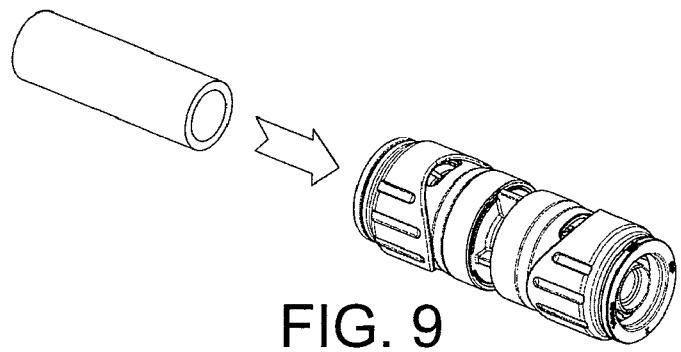
FIGS. 9 to 13 are perspective views of a double-ended version of the coupling body of FIGS. 1 to 5 showing the sequence of operations in inserting a tube into one end of the coupling body, locking the tube in the coupling body against removal and releasing the lock to enable the tube to be withdrawn.
Figure 10:
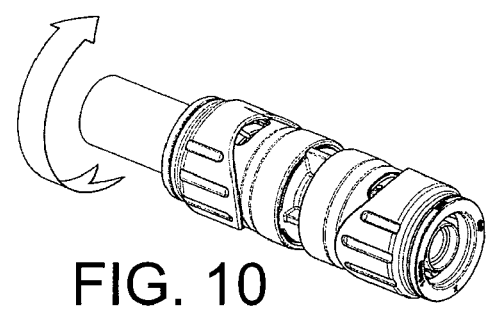
Figure 11:
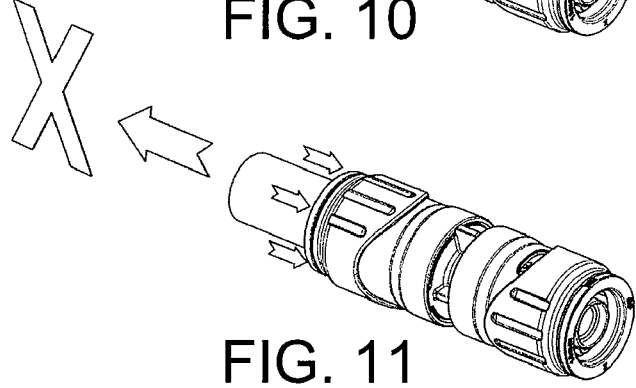
Figure 12:
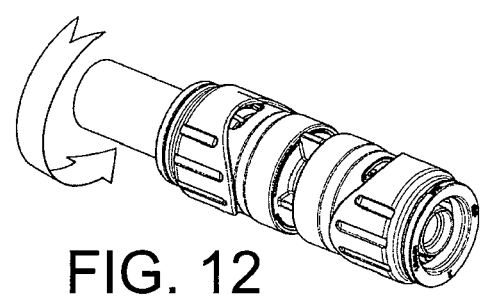
Figure 13:
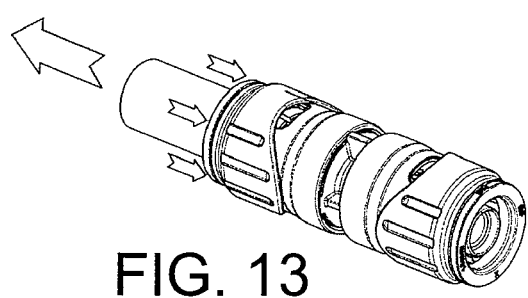
Figure 14:
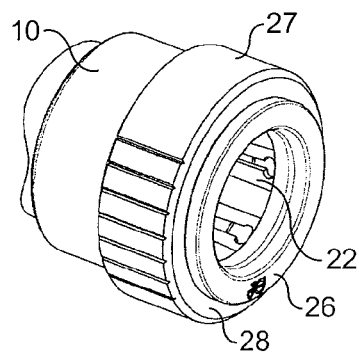
FIGS. 14 to 18 are similar views to FIGS. 5 to 8 showing a modified cam encircling the outer side of the coupling body and cam follower in the collet locking sleeve.
Figure 15:
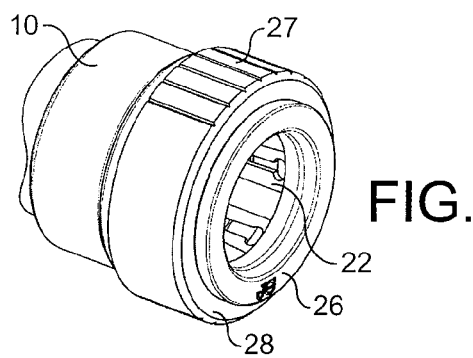

Referring now to FIGS. 6 to 8 of the drawings, the external wall of the coupling body adjacent the end 14 is formed with an encircling cam surface indicated at 30 and facing towards the open end of the throughway. The cam surface has two deep slots 31 extending along the coupling body from the open end of the body past the windows 29 and between the slots the cam surface comprises shallow rising ramps 32 extending from the sides of the slot which end in short ridges 33 with a shallow recess 34 between the ridges.

The sleeve 27 has a pair of generally rectangular integral cam followers 35 (only one of which can be seen in FIG. 8) which are moulded integrally with the inner side of the sleeve and the in-turned flange at the end of the sleeve. The cam followers 35 have a circumferential length corresponding to the width of the slots 31 formed in the cam face on the coupling body. The cam followers engage the cam face and by rotation of the sleeve the axial position of the sleeve with respect to the coupling body is adjusted. When the cam followers 35 are engaged in the slots 31, the flange 29 on the sleeve is located against the end of the coupling body and the collet can be pushed into the socket in the coupling body until the head 26 of the collet engages the flange 28 of the sleeve. In that position of the collet, the heads on the arms of the collet are just disengaged from the tapered cam surface in the coupling body allowing the tube to be inserted or withdrawn from the coupling body. When the sleeve 27 is rotated through 90° to disengage the cam followers 35 from the slots 31, the cam followers ride up the ramps 32 lifting the in-turned end 28 of the sleeve away from the end of the coupling body and forcing the head 26 of the collet away from the end of the coupling body. The cam followers 35 eventually ride over the ridges 33 at the top of the ramps and then drop into the recesses 34 which hold the cam followers against rotation with respect to the coupling body. In this position the heads 23 of the collet are held forcibly against the tapered cam surface 25 in the coupling body locking the heads against the tube 16 and thereby locking the tube in the coupling body. To release the tube from the coupling body, the sleeve 27 is rotated to drive the cam followers 35 out of the recesses 34 and then back into register with the slots 31 where a sleeve can again slide axially over the coupling body until the flange of the sleeve engages the end of the coupling body allowing the collet 20 to move inwardly to release the gripping engagement of the heads of the collet with the tube.

In a further arrangement which is not illustrated the cam is formed in the cap and the cam followers on the coupling body to displace the cap axially with rotation of the cap as outlined above.

The end 40 of the sleeve remote from the top wall 28 is formed with alternate troughs and peaks around the sleeve such as a sinusoidal shape so that in the troughs of the shape, the windows 29 in the coupling body wall are revealed to enable the locking of the tube in the coupling body to be viewed. The windows 29 are exposed when the sleeve is in the collet release position so that the operator can see that the tube 16 is fully inserted onto the spigot 12 in the coupling body before rotating the sleeve to cause the product to grip and lock the tube in position. In the latter position of the sleeve with the cam followers 35 engaged in the recesses 34 in the cam face, the peaks of the sleeve cover the slots in the coupling body. It will be appreciated that other shapes may be applied to the end of the sleeve to achieve the same effect. For example the end of the sleeve may have spaced indentations or recesses to reveal the windows in the coupling body.

FIGS. 9 to 13 show a double-ended coupling body of the form shown in FIGS. 1 to 8 showing a sequence in which the tube is inserted into the coupling body, the sleeve is rotated to lock the tube in the coupling body, the sleeve is rotated to release the tube and the collet is pressed inwardly to allow the tube to be withdrawn from the coupling body.

Figure 16:
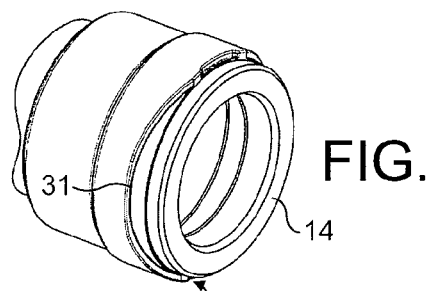
Figure 17:
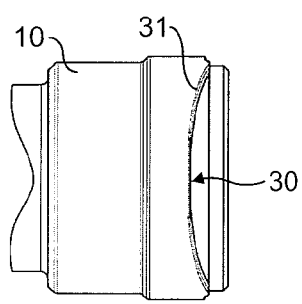
Figure 18:
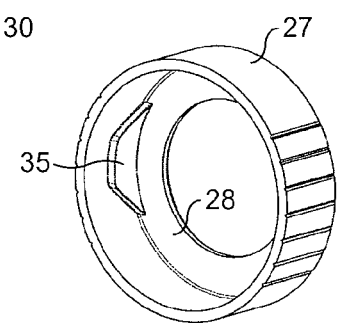
Figure 19:
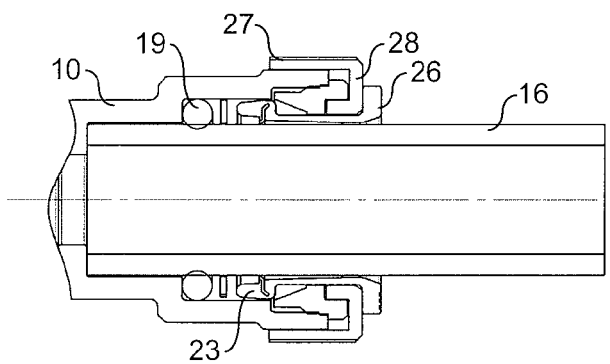
FIGS. 19 to 32 correspond to FIGS. 1 to 13 and show a third modified arrangement.
Figure 20:
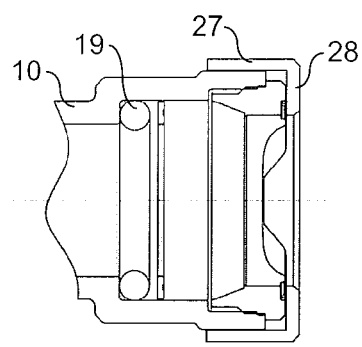
Figure 21:
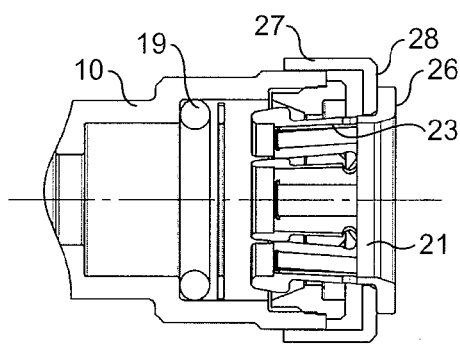
Figure 22:
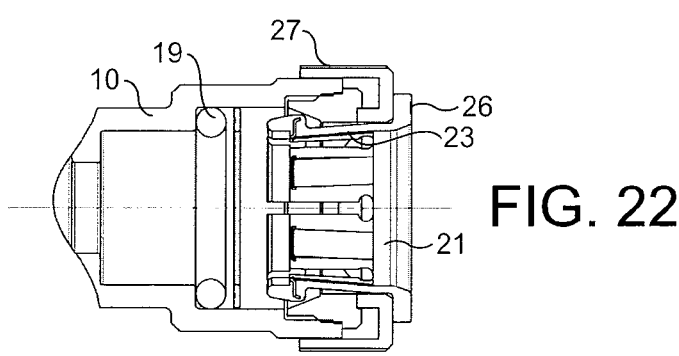
Figure 23:
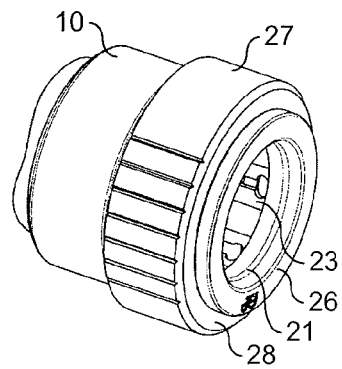
Figure 24:
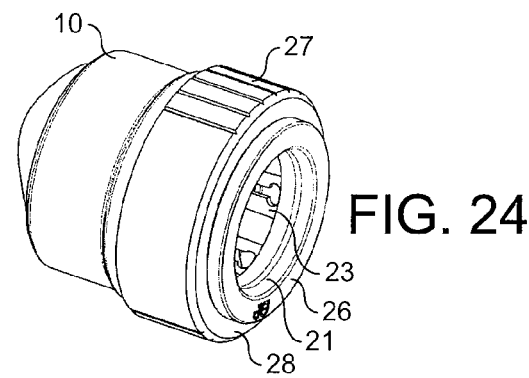
Figure 25:
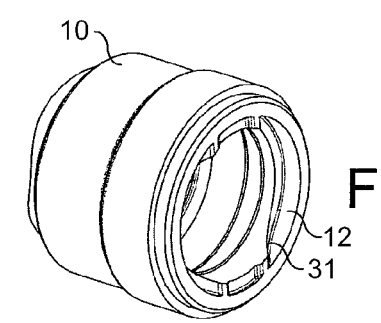
Figure 26:
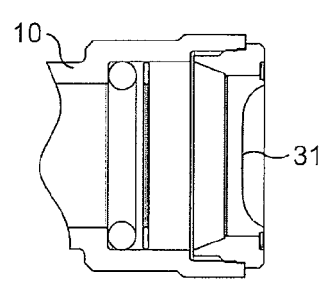
Figure 27:
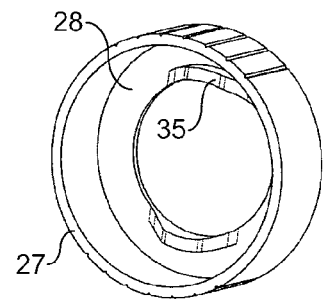
Figure 28:
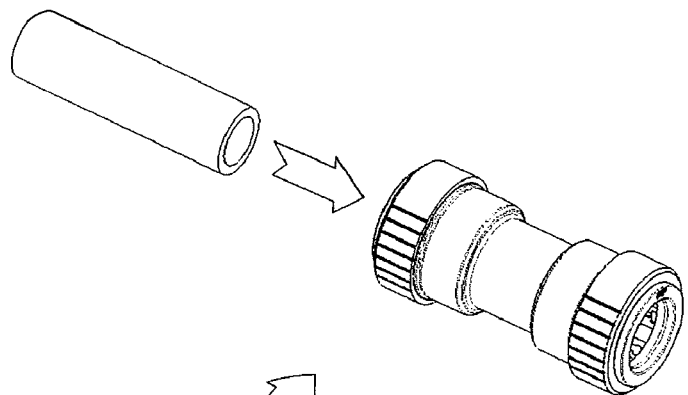
Figure 29:
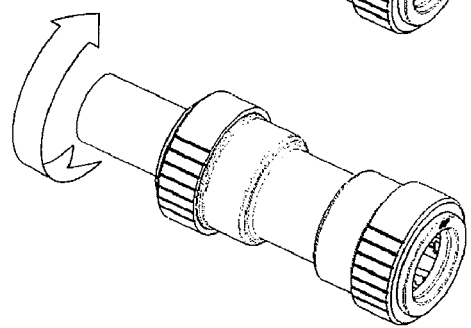
Figure 30:
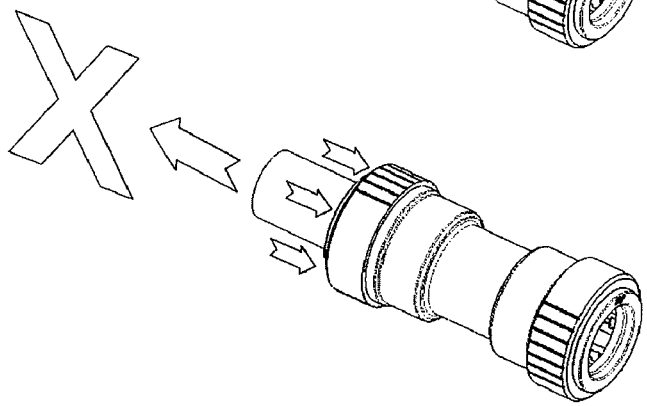
Figure 31:
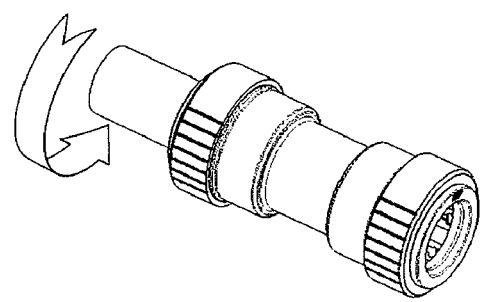
Figure 32:
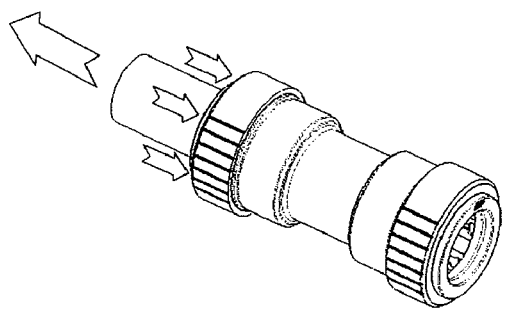
Figure 33:
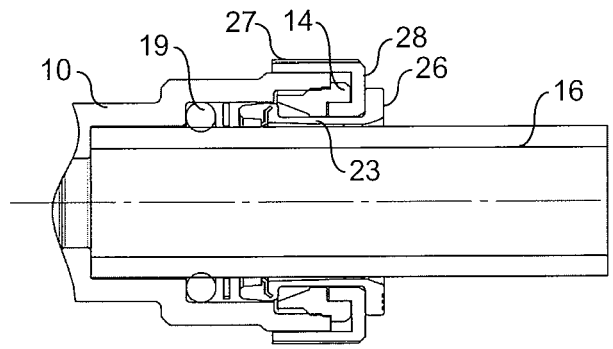
FIGS. 33 to 41 show a fourth modified arrangement and FIGS. 42 to 50 show a fifth modified arrangement.
Figure 34:
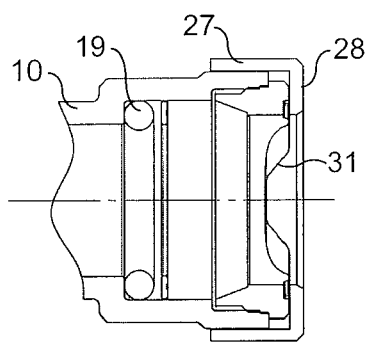
Figure 35:
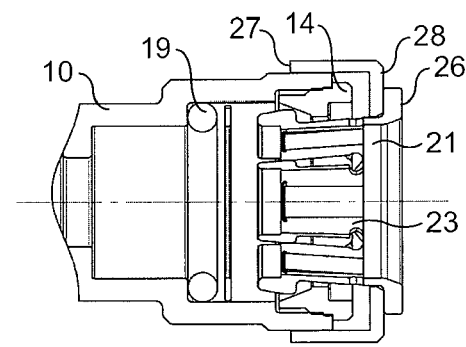
Figure 36:
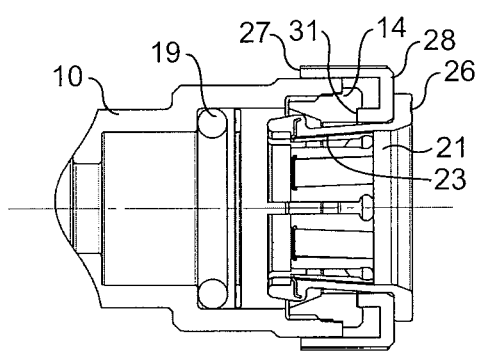
Figure 37:
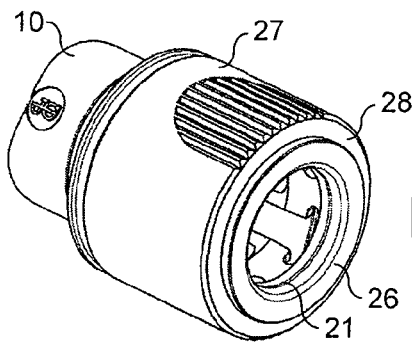
Figure 38:
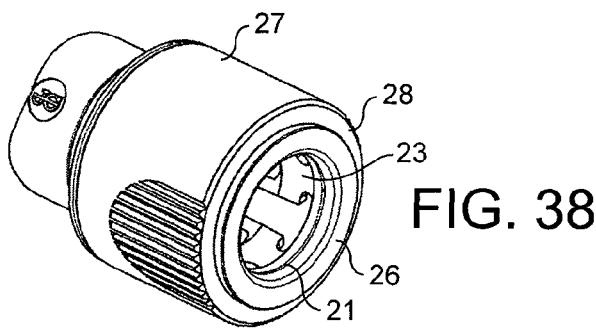
Figure 39:
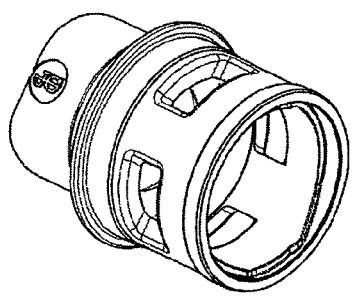
Figure 40:
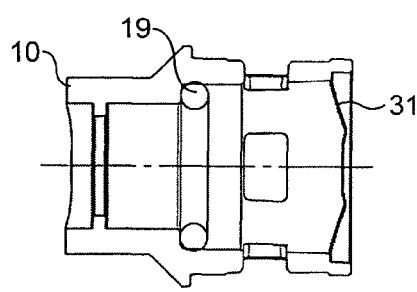
Figure 41:
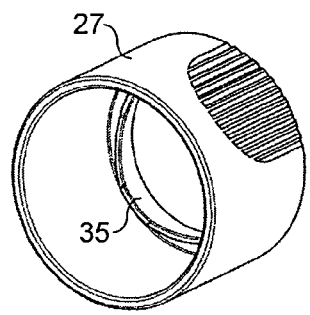
Figure 42:
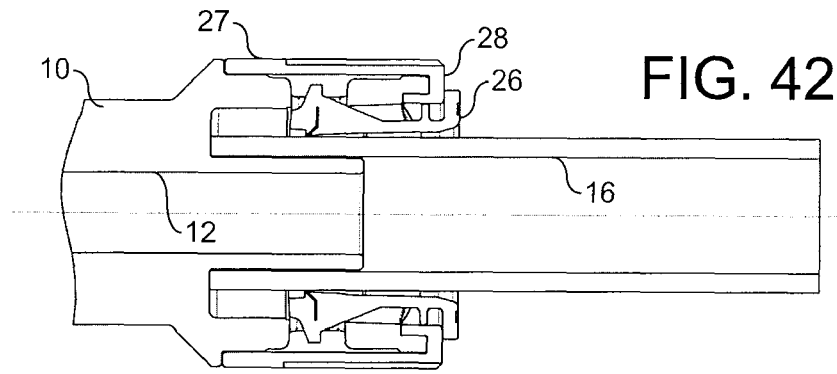
Figure 43:
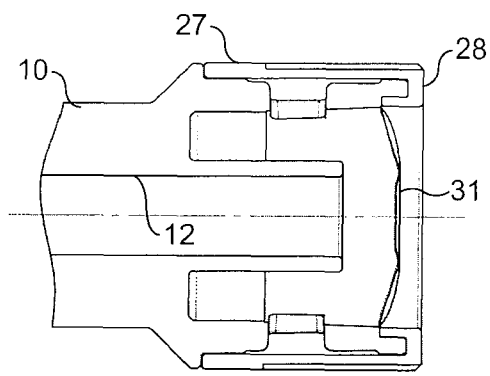
Figure 44:
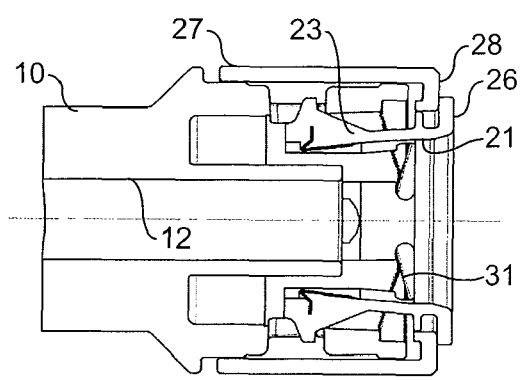
Figure 45:
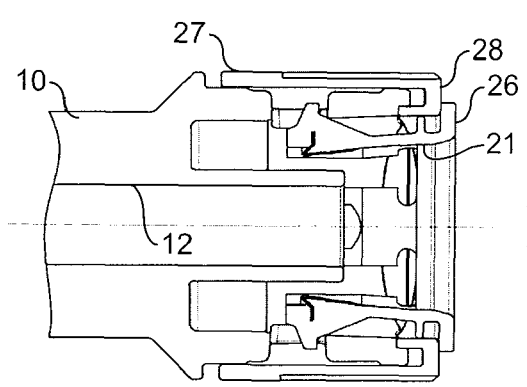
Figure 46:
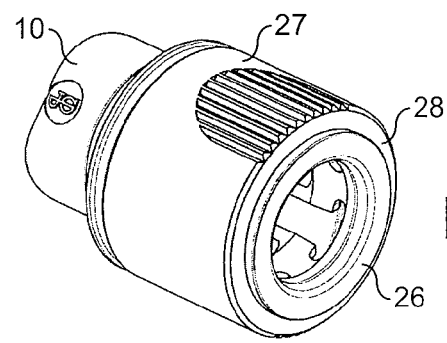
Figure 47:
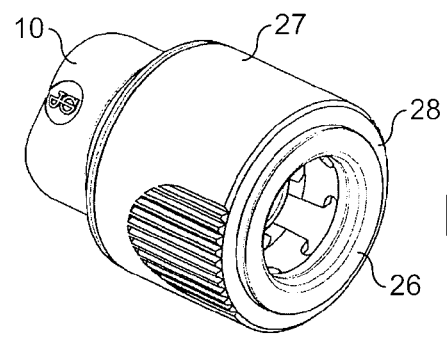
Figure 48:
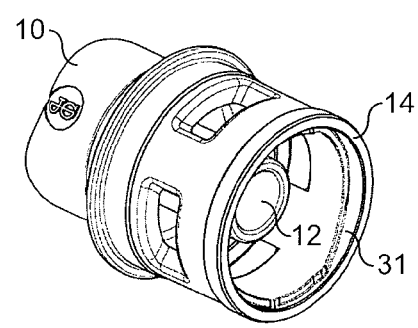
Figure 49:
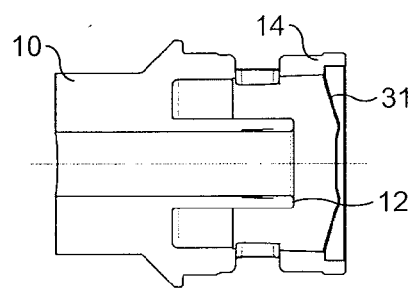
Figure 50:
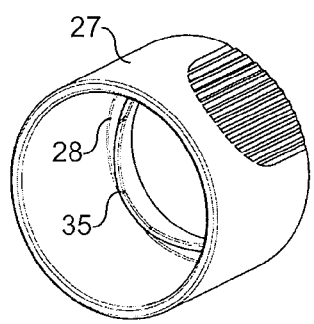

FIGS. 14 to 22 show a similar arrangement with modified cam profile 31 and cam follower 35 as best seen in FIGS. 16 to 18. The extent of axial displacement of the sleeve is reduced in this arrangement because the cam has only shallow recesses 31 extending along the coupling body in place of the deep slots 31 of the previous arrangement. The features of the arrangement are otherwise similar to the previously described embodiments.

FIGS. 9 to 27 show a still further arrangement in which the cam surface 31 for actuating the sleeve is formed internally in the mouth of the coupling body and the cam followers 35.

FIGS. 33 to 41 and 42 to 50 show still further forms of cam around the mouth of the coupling body and on the in-turned flange at the end of the sleeve. Again the operation of the sleeve for locking and releasing the collet is much the same as that described in respect of the first embodiment.

In a further arrangement applicable to any of the above arrangements rotation of the sleeve with respect to the coupling body is limited to 180° by, for example, an element on the sleeve and an end stop formed in said cam.

Figure 51:
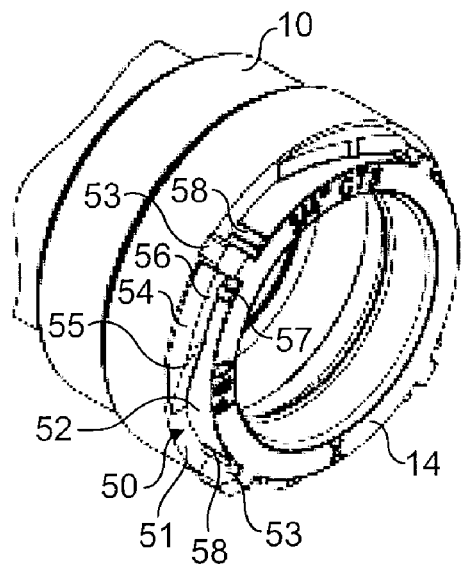
FIGS. 51 and 52 show a sixth modified arrangement.
Figure 52:
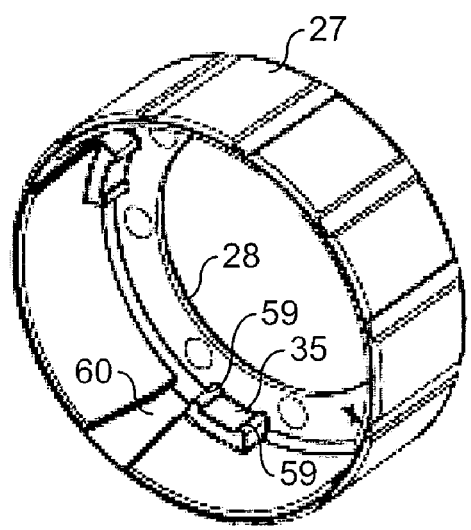

FIGS. 51 and 52 show yet a further application of the invention. FIG. 51 shows the coupling body 10 of the modified arrangement with the collet and collet lock removed.

The coupling body end 14 has a peripheral rebate indicated generally at 50 which forms an axially facing step 51 adjacent the end of the coupling body and a short collar 52 on the end of the coupling body. The collar 52 has four equi-spaced integral, outwardly projecting lugs 53 the outer faces of which are slightly proud of the outer face of the coupling body 10.

Each lug 53 has an adjacent cam 54 which winds around the collar 52. Each cam comprises a ramp 55 rising from the step 51 to a flat 56 extending parallel to the end of the coupling body and which leads to the lug 53 associated with the cam. A short spline 57 is formed down the outer side of the collar 52 above the flat 56 adjacent one side of the lug 53 and a similar spline 58 is formed on the outer side of the collar adjacent the other side of the lug 53.

Referring now to FIG. 52 of the drawings, the sleeve 27 has four equi-spaced cam followers 35 moulded in the sleeve adjacent the end flange 28 of the sleeve. Each cam follower 35 has splines 59 formed on the inner side of the cam follower at either end thereof for a purpose to be described later. Tapered slots 60 extend axially along the inner side of the sleeve to one side of each of the cam followers 35.

When the sleeve 27 is assembled on the coupling body, the slots 60 are aligned with the lugs 53 to ease the location of the sleeve onto the coupling body. The cam followers 35 engage in the peripheral rebate 50 around the end of the coupling body, each follower being movable between a lug 53 and a cam 54. When the sleeve 27 is rotated to cause the cam followers 35 to rise up the ramps 55, the sleeve is displaced axially outwardly of the coupling body as described earlier to hold the collet located in the mouth of the coupling body in the tube locking position. The sleeve reaches its position of maximum axially outward movement from the coupling body when the cam followers 35 move onto the flats 56 of the cams. The sleeves 35 can be locked in that position by forcing the leading spline 59 of the cam follower 35 past the spline 57 on the adjacent side of the lug 53 to resist return movement of the sleeve.

When the sleeve is rotated in the opposite direction, the cam followers 35 run over the flats 56 and down the ramps 55 of the cams 54 onto the step 51. The sleeve is then allowed to move axially over the coupling body releasing the locking engagement of the collet with the tube and allowing the tube to be withdrawn from the coupling body. The sleeve can be retained in that position by snapping the spline 59 at the leading end of the cam follower in its return movement past the spline 58 on the side of the lug 53 adjacent the bottom of the ramp 55. Thus the cam followers 35 are constrained to move between adjacent pairs of lugs 53 to have an overall rotation of a little less than 90°.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tube coupling comprising:
a coupling body having an open ended throughway to receive a tube,
a collet located in the open end of the throughway having a ring and a plurality of flexible arms extending generally axially of the ring into the throughway, the throughway having a tapered cam surface convergent towards said open end and the collet arms having heads at their distal ends for engaging both the cam surface and the tube extending through the collet into the throughway to be compressed against the tube by the cam surface with outward movement of the collet with respect to the throughway to secure the tube in the throughway, the coupling body having one or more apertures to enable the location of the tube inserted into the throughway to be viewed, and
a collet lock rotatably mounted on the coupling body having one rotary position in which the lock holds the collet in an outward tube securing position and another rotary position in which the collet can move axially with respect to the throughway for release and engagement of the tube by the collet, wherein the collet lock comprises a sleeve encircling the coupling body, the sleeve being shaped to cover the one or more apertures on the coupling body in a collet locked position and to reveal the one or more apertures in a collet released position.

2. A tube coupling as claimed in claim 1, wherein the collet lock has means for driving the collet outwardly of the throughway with rotation of the lock and to retain the collet in the outward tube securing position.

3. A tube coupling as claimed in claim 2, wherein the collet lock and coupling body have interengaging guide means to displace the collet lock axially outwardly of the coupling body with rotation of the collet lock and thereby to drive the collet outwardly of the coupling body.

4. A tube coupling as claimed in claim 3, wherein the interengaging means acting between the collet lock and the coupling body comprise cam means acting between the collet lock and coupling body.

5. A tube coupling as claimed in claim 4, wherein the cam means comprise a cam and cam follower on the collet lock and coupling body respectively or vice versa.

6. A tube coupling body as claimed in claim 5, wherein a cam surface is formed around the coupling body and a cam or cams are formed in the sleeve which engage the cam surface.

7. A tube coupling as claimed in claim 6, wherein the cam surface is formed on the outer side of the coupling body within the sleeve and the cam or cams are formed on the wall of the sleeve encircling the coupling body.

8. A tube coupling as claimed in claim 6, wherein the cam surface is formed on the throughway within the coupling body and the cam or cams are formed on an in-turned wall at one end of the sleeve to project into the throughway.

9. A tube coupling as claimed in claim 6, wherein the cam surface on the coupling body is shaped so that there is 90° of rotation of the sleeve between the collet locked position and the collet released position.

10. A tube coupling as claimed in claim 6, wherein the cam surface is shaped to resist rotation of the sleeve in either direction from the collet locked position.

11. A tube coupling as claimed in claim 10, wherein the cam surface is provided with a shallow recess to receive a cam in the collet locked position to provide resistance to rotation of the sleeve from the collet locked position in either direction.

12. A tube coupling as claimed in claim 1, wherein the sleeve is coupled to the ring of the collet to draw the collet outwardly of the coupling body with axial movement of the sleeve outwardly of the coupling body.

13. A tube coupling as claimed in claim 12, wherein the collet ring projects from the open end of the coupling body and one end of the sleeve projects beyond that end of the coupling body and has an in-turned flange which engages with the ring so that axially outward movement of the sleeve drives the collet axially outwardly of the throughway.

14. A tube coupling as claimed in claim 13, wherein the collet ring has an out-turned head and the flange of the sleeve engages behind the head.

15. A tube coupling as claimed in claim 1, wherein rotation of the collet lock with respect to the coupling body is restricted.

16. A tube coupling as claimed in claim 15, wherein rotation of the collet lock is restricted to not more than 90° or not more than 180° with respect to the coupling body.

17. A tube coupling as claimed in claim 15, further comprising means to restrict rotation of the collet lock with respect to the coupling body, the means comprising interengageable elements on the collet lock and coupling body.

18. A tube coupling as claimed in claim 1, wherein the throughway comprises a throughway passage that extends through the coupling body and an annular recess that encircles a portion of the throughway passage, the collet being at least partially disposed within the annular recess.

19. A tube coupling comprising:
a coupling body having an end face with a passage formed therein, the coupling body having one or more apertures to enable the location of a tube to be viewed when the tube is inserted into the passage;
a collet having a ring and a plurality of flexible arms extending generally axially of the ring and into the passage, the passage having a tapered cam surface convergent towards the end face and the collet arms having heads at their distal ends, the collet being configured so that when the collet is moved outwardly in the passage the heads of the collet are pressed radially inwardly by the cam surface so that the heads can compress against the tube when the tube is received through the collet within the passage so as to secure the tube in the passage; and
a collet lock rotatably mounted on the coupling body having a first rotary position in which the collet lock holds the collet in an outward tube securing position and a second rotary position in which the collet can move axially with respect to the passage for release of the tube by the collet when the tube is received through the collet within the passage, wherein the collet lock comprises a sleeve encircling the coupling body, the sleeve being shaped to cover the one or more apertures when the collet lock is in the first rotary position and to reveal the one or more apertures when the collet lock is in the second rotary position.

20. A tube coupling as claimed in claim 19, wherein the passage comprises an annular recess formed in the end face of the coupling body.

21. A tube coupling as claimed in claim 19, wherein the passage comprises a throughway passage extending through the coupling body.

* * * * *